US008040218B2

(12) United States Patent
Hays et al.

(10) Patent No.: US 8,040,218 B2
(45) Date of Patent: Oct. 18, 2011

(54) GPS ENABLED KEY MANAGEMENT SYSTEM

(75) Inventors: Jonathan Gordon Hays, Newberg, OR (US); Adam Purdue, Keizer, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 650 days.

(21) Appl. No.: 12/130,003

(22) Filed: May 30, 2008

(65) Prior Publication Data

US 2009/0167488 A1 Jul. 2, 2009

Related U.S. Application Data

(63) Continuation-in-part of application No. 11/968,083, filed on Dec. 31, 2007.

(51) Int. Cl.
*H04Q 9/00* (2006.01)

(52) U.S. Cl. .............. 340/5.73; 340/539.16; 340/539.13

(58) Field of Classification Search ............. 340/539.13, 340/539.16, 539.17, 568.1, 568.7, 568.8, 340/569, 5.73, 5.5
See application file for complete search history.

(56) References Cited

U.S. PATENT DOCUMENTS

| | | | | |
|---|---|---|---|---|
| 5,587,702 | A | 12/1996 | Chadfield | |
| 6,192,236 | B1 * | 2/2001 | Irvin | 455/420 |
| 6,472,973 | B1 * | 10/2002 | Harold et al. | 340/5.73 |
| 6,611,232 | B1 | 8/2003 | Wunderlich et al. | |
| 6,727,801 | B1 * | 4/2004 | Gervasi et al. | 340/5.73 |
| 7,606,558 | B2 | 10/2009 | Despain et al. | |
| 2003/0179075 | A1 | 9/2003 | Greenman | |
| 2004/0219903 | A1 * | 11/2004 | Despain et al. | 455/410 |
| 2005/0006452 | A1 | 1/2005 | Aupperle et al. | |
| 2007/0159297 | A1 | 7/2007 | Paulk et al. | |
| 2008/0103787 | A1 * | 5/2008 | Cavanaugh et al. | 705/1 |
| 2008/0136678 | A1 | 6/2008 | Harrington | |
| 2008/0246587 | A1 * | 10/2008 | Fisher | 340/5.73 |

FOREIGN PATENT DOCUMENTS

WO 2008054365 A2 5/2008

* cited by examiner

*Primary Examiner* — Daniel Wu
*Assistant Examiner* — Nay Tun
(74) *Attorney, Agent, or Firm* — Kinney & Lange, P.A.

(57) ABSTRACT

Methods, systems, apparatuses, and computer-readable media are provided for acquisition of a lockbox position. For example, in one embodiment a method is provided which receives positional data for a lockbox. After receiving the lockbox, when the lockbox is associated with one listing, the method determines proximity of the positional data to that one listing. If however, there is more than one listing within a predetermined distance of the positional data, the method compares the positional data with each listing in the plurality of listings. Thereafter, the method transmits a query, which includes at least, a result of the comparison. Embodiments of the invention also include other methods, computer-readable media, apparatuses, and systems that contain features similar to the features in the above described method.

4 Claims, 10 Drawing Sheets

GPS ENABLED KEY MANAGEMENT SYSTEM

CROSS-REFERENCE TO RELATED APPLICATIONS

This application is a continuation-in-part of co-pending U.S. patent application Ser. No. 11/968,083, filed Dec. 31, 2007, which is incorporated by reference herein.

BACKGROUND

1. Field of the Invention

Embodiments of the present invention generally relate to security systems and more particularly, to methods, computer-readable mediums, apparatuses, and systems for acquiring lockbox related data.

2. Description of the Related Art

Lockboxes are typically used to provide a secured storage area for a key (or other access aid) to a locked property accessible by the key. An authorized user can unlock the lockbox to obtain the key and use the key to unlock the locked property.

The locked property can be, for example, a home or other property that is locked (usually while unattended) by a traditional lock that requires a key. In other situations, the locked property can be a commercial or industrial site, or other type of property.

The lockbox is typically attached to a door handle or to another stationary object near the traditional lock. The lockbox is typically configured to require the user to demonstrate that he is authorized to obtain access to the locked property before the secured storage area is unlocked to allow the user to obtain the key. In a mechanical lockbox, the user might be required to enter a correct lock combination to access the secured storage area. In an electronic lockbox, the user might be required to communicate a credential to the lockbox (via a physical connection to the lockbox or via a wireless link to the lockbox) to access the secured storage area. In some instances, the lockbox is subject to tampering (e.g., vandalism and/or theft).

There are instances when accurate information regarding the lockbox is desired and is not available. Once a lockbox is deployed into the field, its location cannot be ascertained. For example, the lockbox is deployed to a different facility (or location if the facility) than was recorded or assigned.

In some instances when a user enters the location of the lockbox (e.g., when a property is put on a rental or sale listing), the information regarding the lockbox is limited to a serial number associated with the lockbox and is subject to human error.

Therefore, there is a need in the art for improved location detection of lockboxes.

SUMMARY

The present invention generally relates to security systems and more particularly, to methods, computer-readable mediums, apparatuses, and systems for acquiring lockbox related data.

A lockbox can comprise one or more sensors (or other type of detectors) for detecting tampering with one or more portions of the lockbox. For example, in some embodiments the one or more sensors are configured to detect cutting or breaking of the shackle (or other portion of the lockbox) configured to secure the lockbox to another object. As a result of detecting tampering, a wireless communication device coupled to the lockbox transmits a notification to a monitoring station.

In some embodiments, a lockbox comprises a securable storage area for securing a key; a fastening element configured to removably fasten the lockbox to another object; a detection unit configured to detect tampering with the lockbox; and a wireless communication device coupled to the detection unit and configured to transmit a signal to a monitoring station when the detection unit detects tampering with the lockbox. A satellite navigation system receiver can be coupled to the lockbox, wherein the wireless communication device is configured to transmit lockbox location data to the monitoring station. In some embodiments, the wireless communication device is configured to transmit the lockbox location data to the monitoring station as a result of detecting tampering with the lockbox. In further embodiments, the detection unit is configured to detect tampering with the fastening element. In some cases, the fastening element comprises a shackle. In additional embodiments, the detection unit is configured to detect tampering with the storage area. In select embodiments the detection unit comprises an electrical sensor. In some embodiments the detection unit comprises a magnetic sensor. In further embodiments the detection unit comprises an accelerometer. The detection unit can be configured to transmit the signal to the monitoring station if motion detected by the accelerometer exceeds a selected time or intensity threshold. In particular embodiments the lockbox further comprises means for determining at least the approximate geographic location of the lockbox.

In some embodiments, a method of monitoring a lockbox comprises: detecting by the lockbox, in approximately realtime, one or more indications of tampering with the lockbox; and as a result of the detecting, wirelessly transmitting an alert signal from the lockbox to a monitoring station. The method can further comprise wirelessly transmitting location information to the monitoring station. The location information can be transmitted to the monitoring station at a predetermined interval. In some embodiments the method further includes providing an indicator of the alert signal to a law enforcement agency.

In additional embodiments, a system for monitoring a lockbox at a property comprises: a lockbox comprising an area for storing a key to the property, wherein the lockbox is configured to detect tampering with the lockbox and to wirelessly transmit an indicator of the tampering approximately in realtime with the tampering; and a monitoring station configured to receive the indicator and provide a description of the indicator to a user. In at least some cases the lockbox is further configured to wirelessly transmit lockbox location information to the monitoring station.

In another embodiment, a method is provided which receives positional data for a lockbox. After receiving the lockbox, when the lockbox is associated with one listing, the method determines proximity of the positional data to that one listing. If however, there is more than one listing within a predetermined distance of the positional data, the method compares the positional data with each listing in the plurality of listings. Thereafter, the method transmits a query, which includes at least, a result of the comparison.

In yet another embodiment, a method is provided in which communication with a lockbox is initiated. Communication allows acquisition of a global positioning system ("GPS") location for the lockbox. The location (or a derivative thereof) is transmitted towards a key. Thereafter, data is transmitted from the key towards a server. Embodiments of the invention also include computer-readable media, apparatuses, and systems that contain features similar to the features in the above described methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. One of the technical effects of this disclosure is a more accurate location detection of a lockbox. In other instances, well-known features have not been described in order to avoid obscuring the invention. Thus, the invention is not considered limited to the particular illustrative embodiments shown in the specification and all such alternate embodiments are intended to be included in the scope of this invention.

Although the operations of some of the disclosed methods and apparatus are described in a particular, sequential order for convenient presentation, it should be understood that this manner of description encompasses rearrangement, unless particular ordering is required by specific language set forth below. For example, operations described sequentially can in some cases be rearranged or performed concurrently. Moreover, for the sake of simplicity, the attached figures may not show the various ways in which the disclosed methods and apparatus can be used in conjunction with other methods and apparatus.

One of the advantages provided by this solution is that Realtors and brokers can be provided with meaningful showing data because it is associated with a listing address rather than just a serial number. It also alleviates an administrative task for Realtors and brokers by not requiring them to manually assign every box to a listing address. Part of this solution includes a way to determine a listing address based on incoming GPS coordinates. Another application of this solution is that a duress signal could be initiated from either the electronic key or the box that would indicate the location of the user. It incorporates a GPS radio into a key control system. This invention solves this by including a GPS receiver in either the box or the key. The information is then automatically uploaded by the device to the server.

Figure 1:
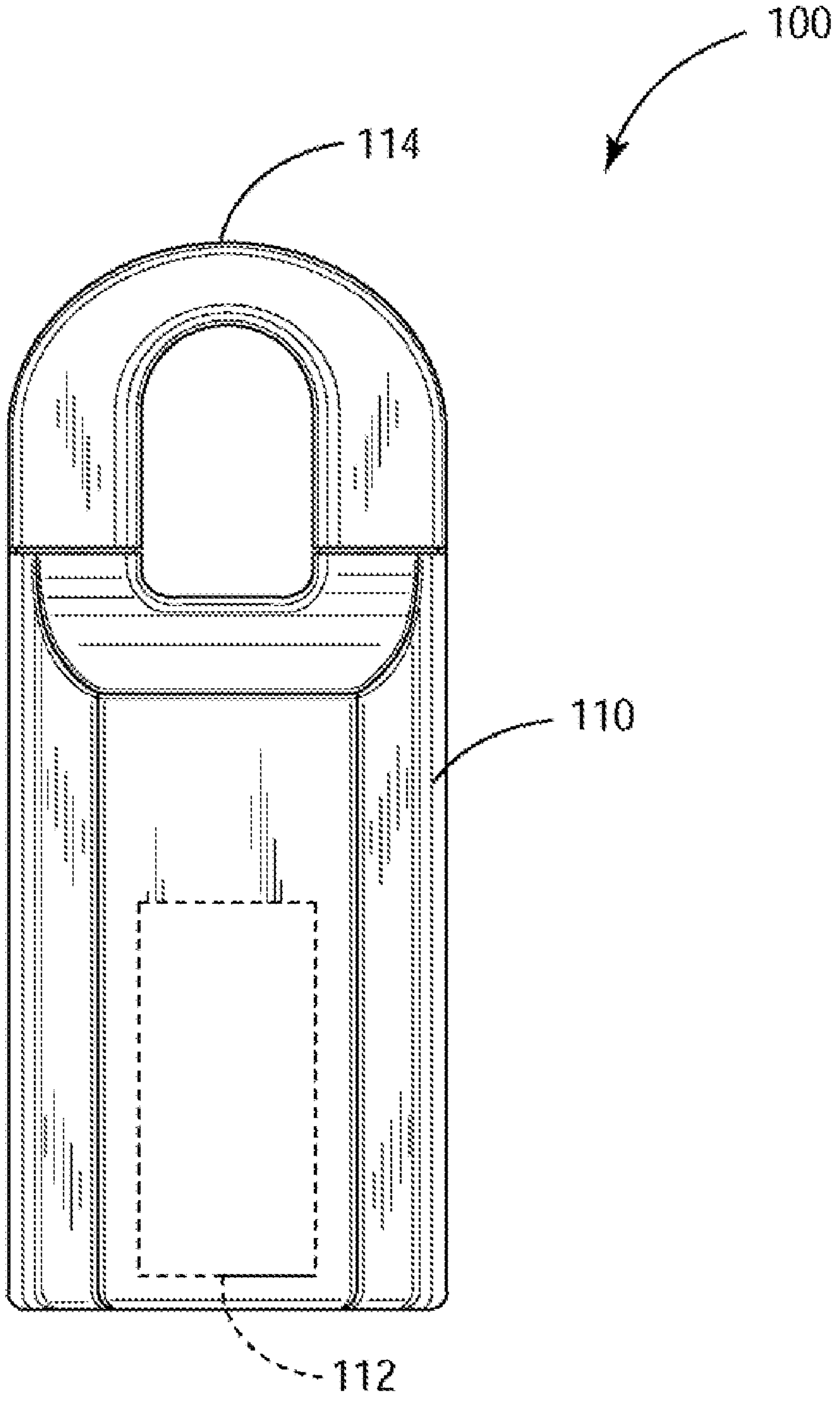
FIG. 1 depicts a front view of an embodiment of a lockbox in accordance with aspects of this disclosure.

FIG. 1 depicts a front view of one embodiment of a lockbox 100. The lockbox 100 includes a housing 110 and associated components such as a key storage area 112 and an electronic control system (not shown in this view, but described in more detail below). In at least some embodiments, the housing 110 is coupled to a fastening element that is configured to secure the lockbox to a stationary object such as a doorknob or pipe. In at least some embodiments described herein, the fastening element includes a shackle (e.g., shackle 114). As exemplified by the shackle 114, in at least some embodiments not all of the components of the lockbox 100 are completely contained within the housing 110.

Figure 2:
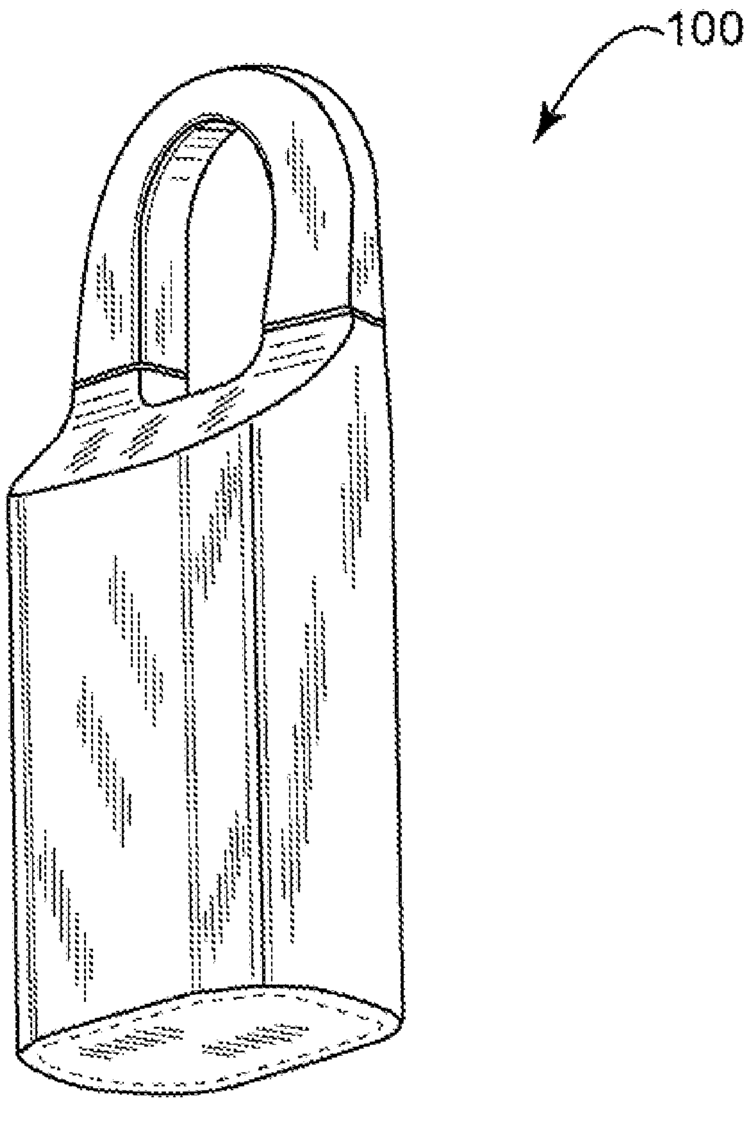
FIG. 2 depicts a perspective view of the lockbox of FIG. 1 in accordance with aspects of this disclosure.

FIG. 2 depicts a perspective view of the lockbox 100. In further embodiments, the lockbox 100 is configured to provide access to the key storage area 112 in response to the detection of and/or interaction with an access device. The access device, also called a "key" or "electronic key," can include a wireless communication device (e.g., a cellular telephone, "smart" phone or other type of telephone (hereinafter "phone"), personal digital assistant ("PDA"), or other personal electronic device). A dedicated access device, i.e., a device having a primary function of communicating with lockboxes, may also be used. In various embodiments, the lockbox supports additional forms of communication, such as WiFi, WiMax, ZigBee, Bluetooth, near-field and infrared (IR) communications (e.g., IrDA), to allow other forms of access devices to be used with the lockbox.

Figure 3:
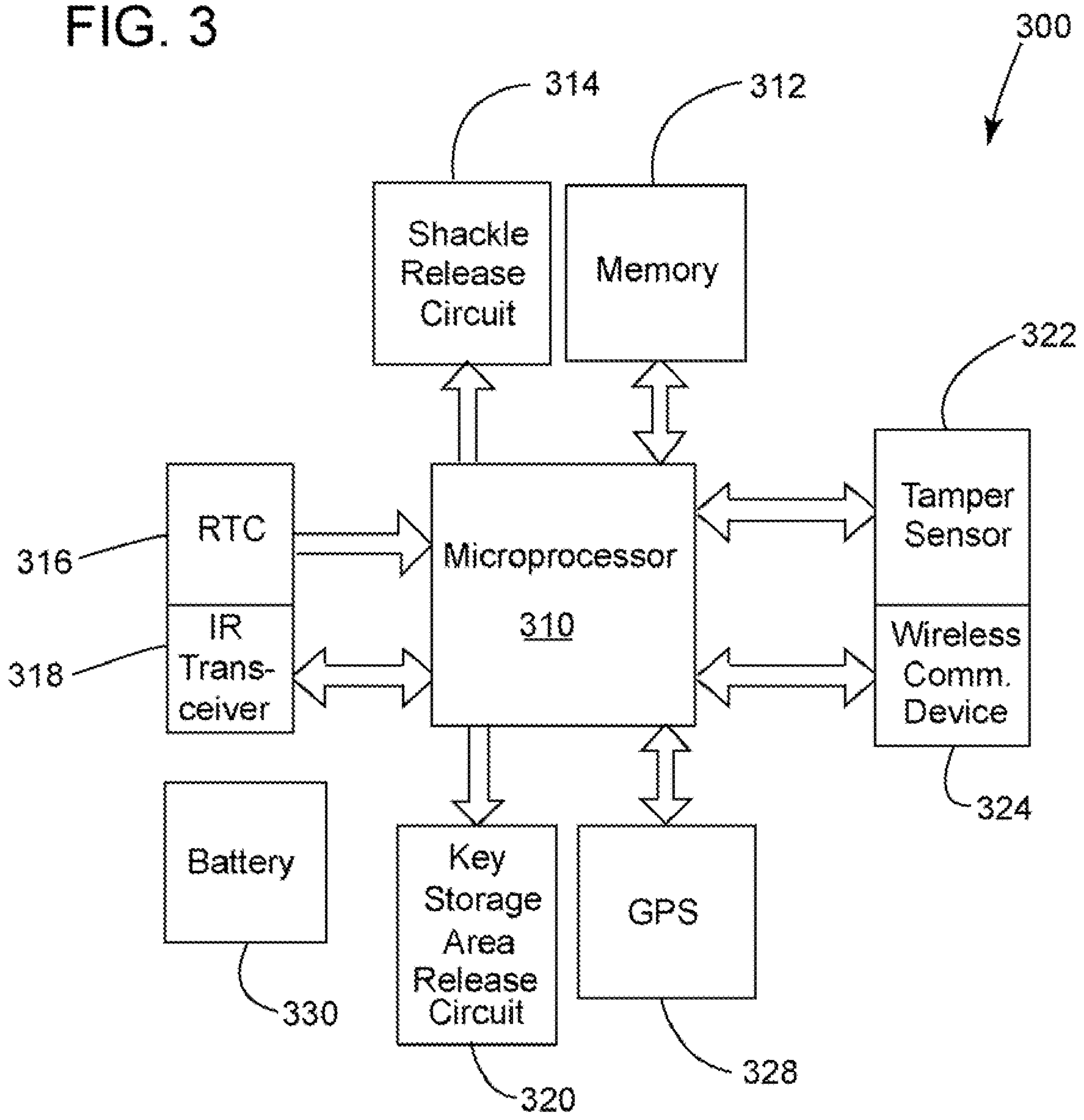
FIG. 3 depicts a block diagram of an embodiment of an electronic control system in accordance with aspects of this disclosure.

FIG. 3 depicts a block diagram of one embodiment of an electronic control system 300 found in the lockbox 100. The system 300 includes a microprocessor 310, which reads data from and/or writes data to a memory 312. The memory 312 generally includes one or more computer-readable media (e.g., RAM, ROM, magnetic storage such as a hard drive, etc.). One or more software instructions for the microprocessor 310 can be stored in the memory 312. The microprocessor 310 is coupled to a real-time clock (RTC) 316, an IR transceiver 318, a tamper sensor 322, a wireless communication device 324, a shackle-release circuit 314, and a key storage area-release circuit 320. The shackle-release circuit 314 and the key storage area-release circuit 320 are configured to open the shackle 114 and the key storage area 112, respectively. The wireless communication device 324 includes, for example, a cellular telephone or similar device. Some embodiments further comprise a satellite navigation system (SNS) receiver 328 (such as a global positioning system (GPS) receiver). Generally, the SNS receiver 328 and the wireless communication device 324 allow the lockbox 100 to transmit geographic location data for the lockbox 100. In some embodiments the system 300 is powered by a power source such as a battery 330. In particular embodiments, the battery 330 is provided by an electronic key and is not necessarily contained within the lockbox 100.

Generally, the tamper sensor 322 is configured to detect possible tampering with the lockbox 100. Tampering includes, for example, unauthorized attempts to access the key storage area 112 or the housing 110, unauthorized attempts to cut or open the shackle 114, and unauthorized attempts to relocate the lockbox 100. In some embodiments, the tamper sensor 322 includes an electronic sensor configured to detect, for example, a change in current or voltage in a portion of the lockbox 110. In particular embodiments, the tamper sensor 322 is configured to detect a current or voltage in the shackle 114. Accordingly, if the shackle 114 is broken, cut or forced open, the tamper sensor 322 detects a change in current or voltage in the shackle 114. In such cases, the microprocessor 310 identifies that tampering of the lockbox 100 is occurring or has occurred. Additional embodiments of the lockbox 100 detect voltage or current changes in one or more other lockbox components (e.g., the key storage area 112 and/or the housing 110).

In further embodiments, the tamper sensor 322 includes an accelerometer. In such embodiments, the sensor 322 is configured to detect motion of one or more parts of the lockbox 100. Generally, such a configuration can be useful for detecting when a component of the lockbox 100 is being forced or cut open using a method that generates movements not typically associated with normal use of the lockbox 100. For example, someone may attempt to use a power tool to cut the shackle 114 so that the lockbox 100 can be moved to another location. Typically, the application of the power tool to the lockbox 100 results in the tamper sensor 322 detecting unusually long and/or intense vibrations on one or more lockbox components. In cases when the detected movement exceeds predetermined thresholds, the microprocessor 310 identifies that tampering of the lockbox 100 is occurring or has occurred. In some embodiments, the thresholds are stored in the memory 312. The thresholds can be provided to the lockbox 100 locally or remotely.

In further embodiments, the tamper sensor 322 includes a magnetic sensor. In such embodiments, the sensor 322 is configured to detect when one or more magnets are being used to manipulate internal components of the lockbox 100 (e.g., one or more components that can open the shackle 114 and/or the key storage are 112).

Figure 4:
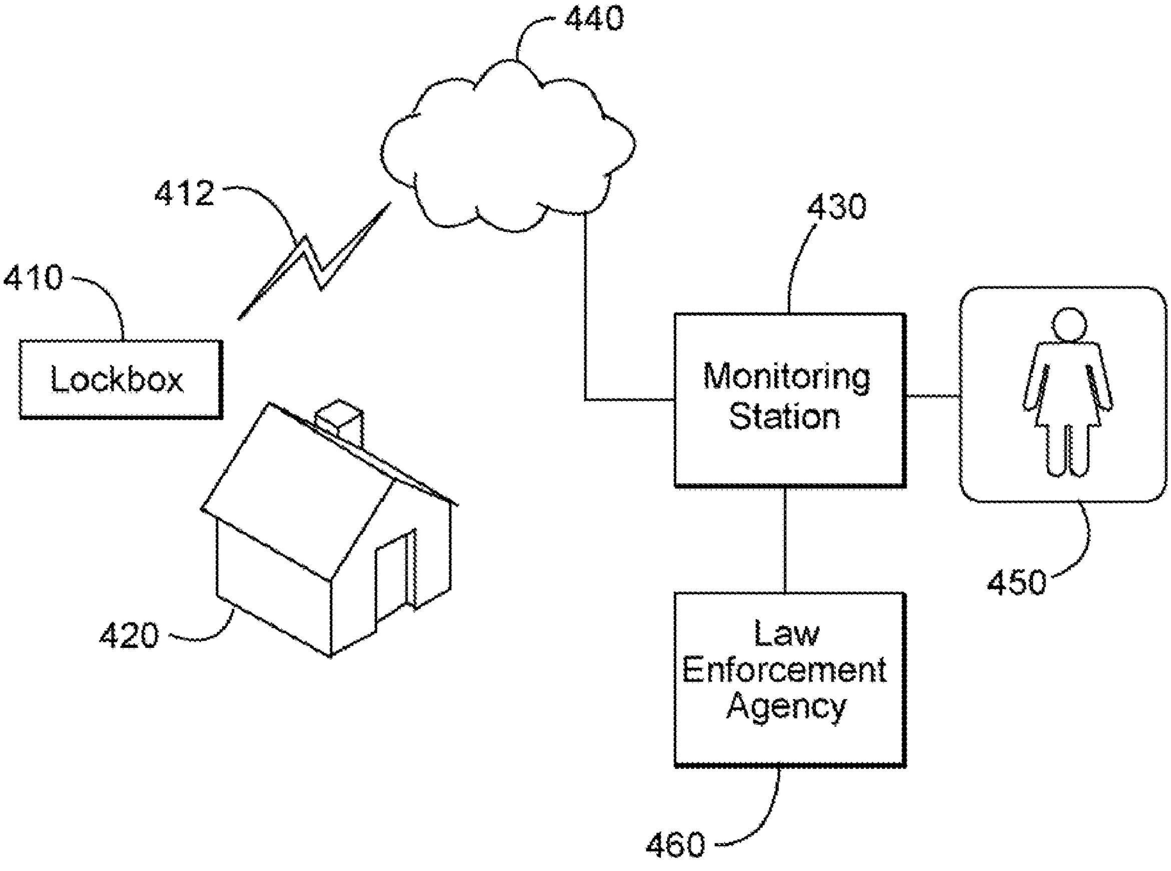
FIG. 4 depicts an embodiment of a monitoring system in accordance with aspects of this disclosure.

FIG. 4 depicts a diagram of an embodiment of a system for monitoring a lockbox 410 at a property 420. The lockbox 410 is similar to the lockbox 100 described above.

Figure 5:
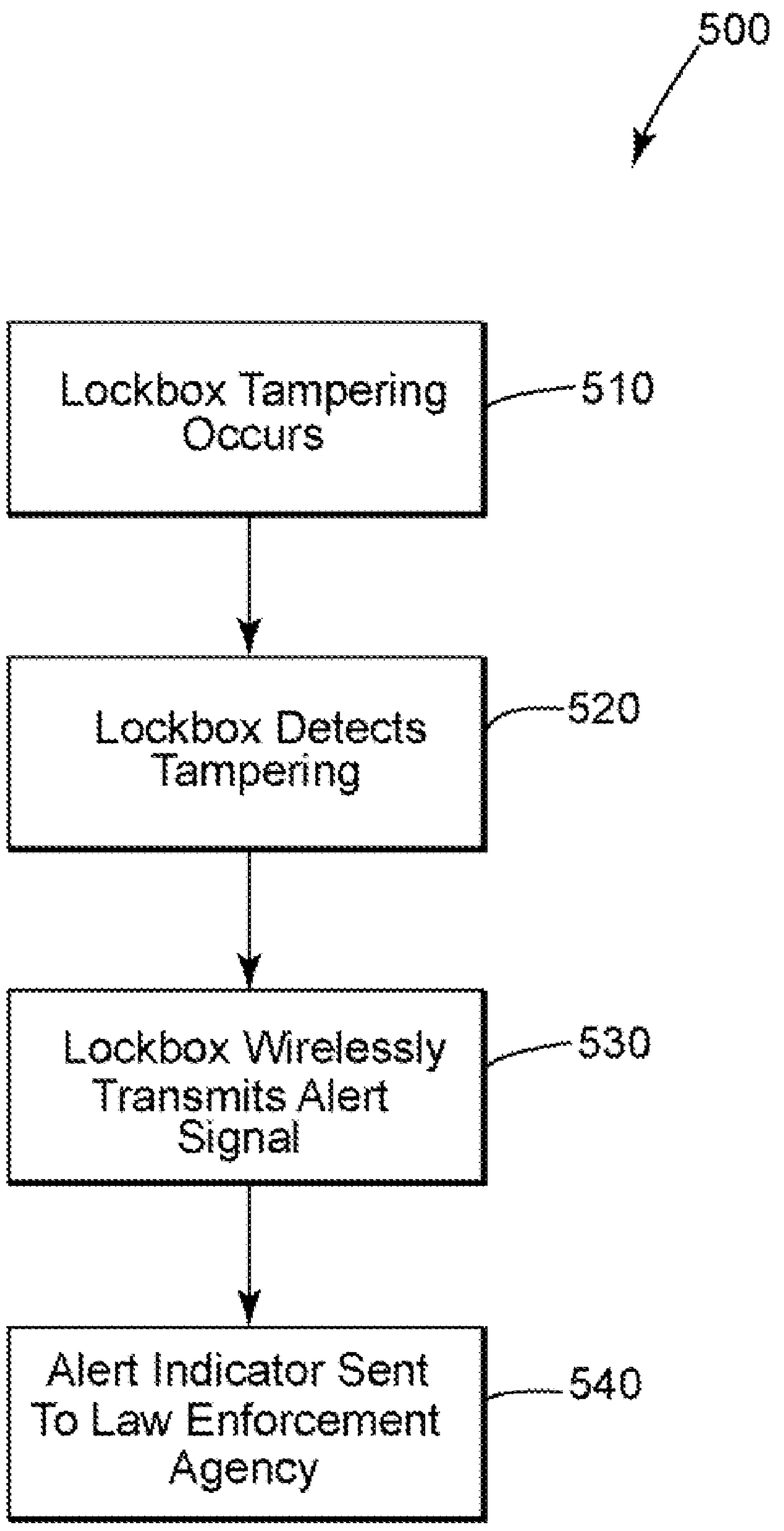
FIG. 5 depicts a flowchart of an embodiment of a method in accordance with aspects of this disclosure.

FIG. 5 depicts a flowchart of an embodiment of a method 500 for monitoring the lockbox 410 in conjunction with, for example, the system of FIG. 4. In the method 500, lockbox tampering occurs at 510. The microprocessor 310, in the lockbox 410, detects that the tampering is occurring or has occurred and wirelessly transmits an alert signal in a method act 530. FIG. 4 depicts the lockbox 410 transmitting a signal 412 to a monitoring station 430, which in some embodiments is remotely located from the lockbox 410. The signal 412 can be sent in real-time or approximately in real-time with the detection of the tampering. In select embodiments, the signal 412 includes an indication that tampering with the lockbox 410 has been detected. In further embodiments, the signal 412 includes one or more details regarding the nature of the detected tampering (e.g., one or more parts of the lockbox to which the tampering is related). In some embodiments, the signal 412 is sent via a wireless communication network 440. The monitoring station 430 includes one or more computers (not shown) configured to receive data from the lockbox 410.

In particular embodiments, as a result of receiving the signal 412, the monitoring station 430 can provide an indicator (e.g., an alert signal) to a human operator 450. The indicator can be provided to the human operator 450 by a variety of communication systems (e.g., wired or wireless). In further embodiments, in a method act 540 the monitoring station 430 provides the indicator to a law enforcement agency 460.

In particular embodiments the signal 412 includes location data for the lockbox 410. However, in some embodiments the lockbox 410 sends location data to the monitoring station 430 independently of whether any tampering with the lockbox 410 has been detected. In further embodiments, the lockbox 410 sends location data to the monitoring station 430 multiple times (e.g., periodically) after tampering is detected.

This can allow, for example, for tracking of the lockbox 410 to determine if the lockbox 410 has been moved after the tampering has occurred. In additional embodiments, the lockbox 410 is configured to detect unauthorized movement of the lockbox 410 from one location to another (e.g., based on the lockbox location data) independent of tampering detected by the tamper sensor 322. If unauthorized movement is detected, the lockbox 410 can transmit an alert signal. The lockbox 410 can determine if detected movement of the lockbox 410 is authorized based on, for example, whether or not the lockbox 410 has received an indicator authorizing lockbox movement. In further embodiments, the monitoring station 430 determines at least in part if a detected movement of the lockbox 410 is unauthorized.

At least some embodiments of the technologies described above can allow for a user of a lockbox to remotely determine a potential or actual problem with the lockbox rather than, for example, first becoming aware of the problem upon physical inspection of the lockbox. This can help the user avoid situations where, for example, tampering with a lockbox is not discovered until a property is visited by the user, perhaps with a client. Potentially, the technologies can be used to help discover and/or apprehend those performing and/or aiding in the tampering. In some embodiments, the lockbox 410 transmits location data and/or sensor data in response to a request from a user (e.g., 5 a realtor) and/or from the monitoring station 430. The request can be sent to the lockbox 410 via a web page or other user interface.

Figure 6:
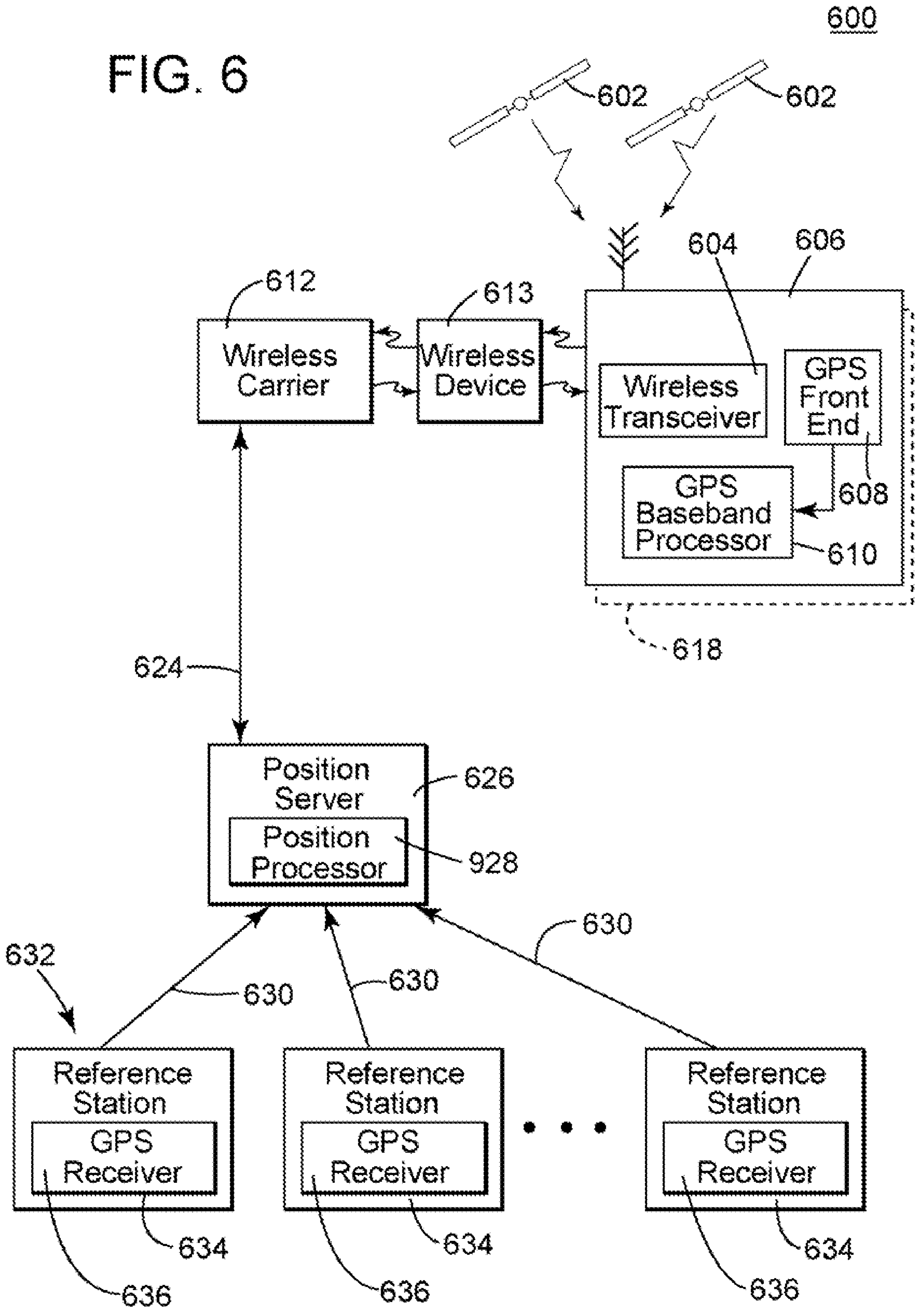
FIG. 6 depicts an exemplary block diagram of a lockbox location system in accordance with aspects of this disclosure.

FIG. 6 depicts a block diagram of an embodiment of lockbox location system 600. The lockbox location system 600 uses a GPS (or other similar satellite position location system) having a plurality of satellites 602 orbiting the earth. The lockbox location system 600 includes a reference station network 632, a position server 626 with software that executes GPS processing algorithms, and a plurality of lockboxes 606 (for illustrative purposes only one lockbox 606 is depicted).

In various embodiments, the GPS algorithms and GPS circuitry remains inactive (i.e., off or disabled) until an occurrence of a triggering event (e.g., a shade opening or closing; or detecting of tampering).

The reference station network 632 includes a plurality of geographically dispersed reference stations 634 where each reference station 634 includes a fixed site GPS receiver 636. The lockboxes 606 are coupled to or otherwise associated with a mobile wireless device 613 (e.g., a cellular phone or pda). The mobile device communicates with the position server 626 via a wireless carrier 612. Each reference station 632 further includes a conventional GPS receiver 636 (collectively conventional GPS receivers 636) located at a precisely known location. For example, for a global network, the network includes just a plurality of reference stations 632. Each of the conventional GPS receivers 636 is coupled to the position server 620 via a network communications link 630.

In one embodiment, the position server 626 is utilized to determine the location of the lockbox 606. The lockbox 606 contains a wireless communications transceiver 604 that enables the lockbox 606 to communicate with the wireless device 613. In various embodiments, the wireless device 613 receives the position of the lockbox 606, events that have occurred (e.g., access to the lockbox, or tampering with the lockbox), and/or the time of the event(s). Thereafter, the wireless device 613 transmits the information towards the monitoring station (not shown).

In other embodiments, the position of the wireless device 613 is computed. Because of the proximity of the wireless device 613 to the lockbox 606, the location of the wireless device 613 is considered an estimate of the location of the lockbox 606.

In various embodiments, the wireless device 613 transmits the lockbox position and other lockbox related data (e.g., the position of the lockbox, events, and the time of the events) towards a wireless carrier 612. The wireless carrier 612 communicates with the position server 626 through a conventional communication network 624.

In various embodiments, the lockbox 606 includes a wireless transceiver 604, a GPS receiver front end 608, and a GPS baseband signal processor 610. The GPS signal processor 610 can, in various embodiments, include a highly parallel GPS correlator and associated software to perform various computations to assist in acquiring the location of the lockbox. In various embodiments, the lockbox 606 receives initialization data from the position server 626 through a wireless link 616, collects certain GPS signal information, processes that information and sends the processed information through link 614 to the wireless carrier 612.

In one embodiment, the position server 626 processes the GPS information from the wireless device 613 to determine the lockbox location.

In one embodiment, the fixed site GPS receivers 636 of the reference station network 632 transmit GPS measurements received from all the visible satellites 602. The measurements (or a derivative thereof) are transmitted from each GPS receiver 636 to the position server 626. For example, the measurements can be transmitted through the reference station network 632 via a router and dedicated landline (e.g., ISDN, T1, T2, and the like) or in TCP/IP format over the Internet to a hub at the position server 628. The communication network components are represented by links 630. Thereafter, the position server 626 is responsible for computing the position of the lockbox 606 by using, in part, the GPS data transmitted across the reference station network 632.

In various embodiments, measurements are stored in a lookup table. If the measurements are the same as measurements already stored in the lookup table then the position of the lockbox is presumed to be the same as the position associated with the already stored measurements.

Figure 7:
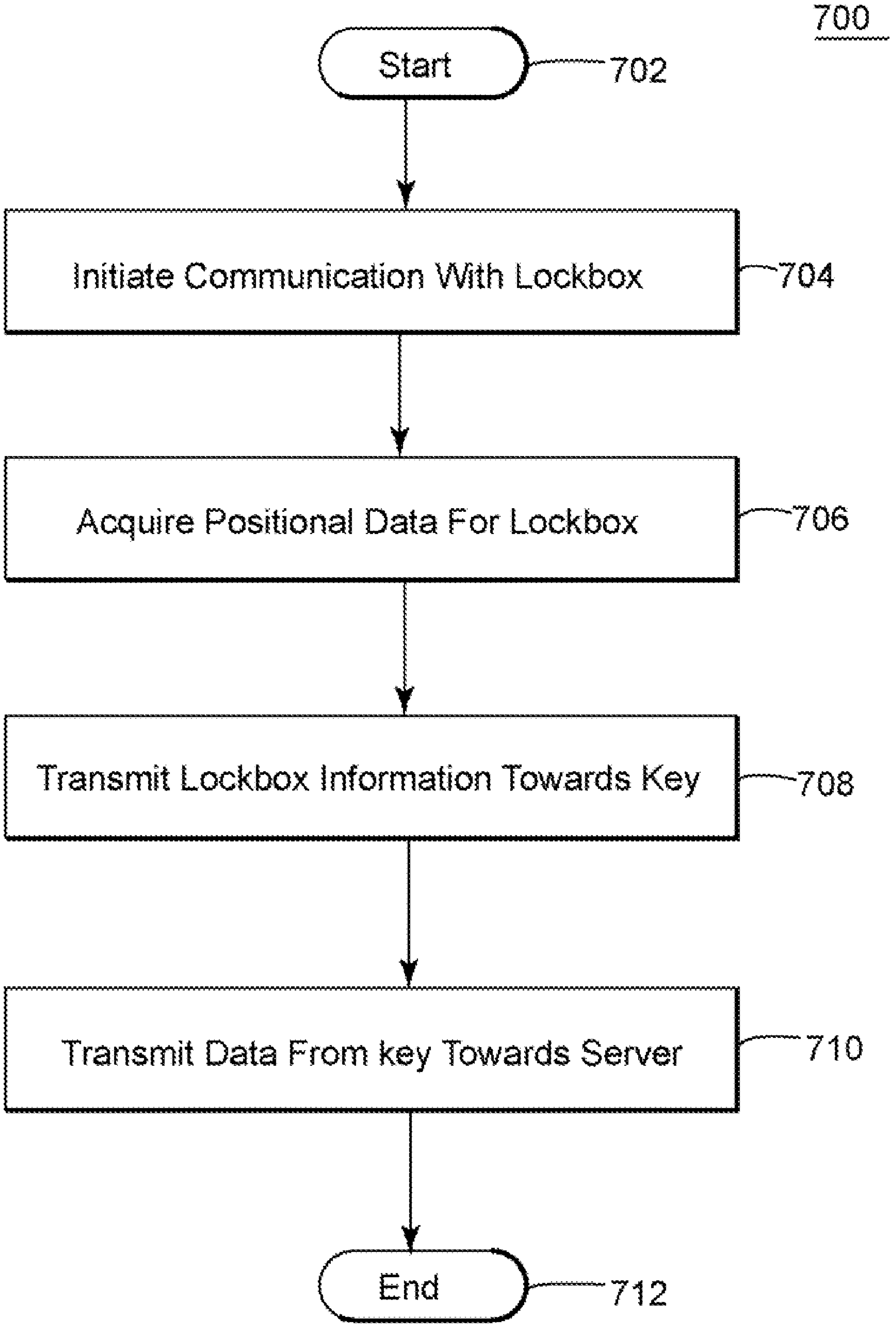
FIG. 7 depicts an embodiment of method in accordance with aspects of this disclosure.

FIG. 7 depicts an embodiment of a method 700 in accordance with aspects of this disclosure. The method 700 begins at step 702 and proceeds to step 704.

At step 704, communication with a lockbox (e.g., lockbox 100) is initiated, via a key (e.g., a cell phone or pda). In various embodiments, communication with the lockbox is initiated as explained above. However, it is appreciated that communication with the lockbox can be initiated in other ways.

For example, in various embodiments, the lockbox is equipped with cellular network circuitry (e.g., code division multiple access ("CDMA") or global systems for mobile communications ("GSM")). In these embodiments, the server can initiate communication with the cellular circuitry inside the lockbox.

After communication is initiated, the method 700 proceeds to step 706.

At step 706, the method 700 acquires a GPS location for the lockbox. In various embodiments, computations are performed in the lockbox to determine the location of the lockbox. In other embodiments, the lockbox acquires its position from an outside source. Thereafter, the method 700 proceeds to step 708.

At step 708, the lockbox transmits information to the wireless device (e.g., a key). The information includes, but is not limited to, the location of the lockbox, information regarding a user who accessed the lockbox, and/or other events stored in the lockbox. After the key has received the information from the lockbox, the method 700 proceeds to step 710.

At step 710, the key transmits the information from the lockbox to the server. After transmission of the lockbox, by the keypad, the method 700 proceeds to and ends at step 712.

Figure 8:
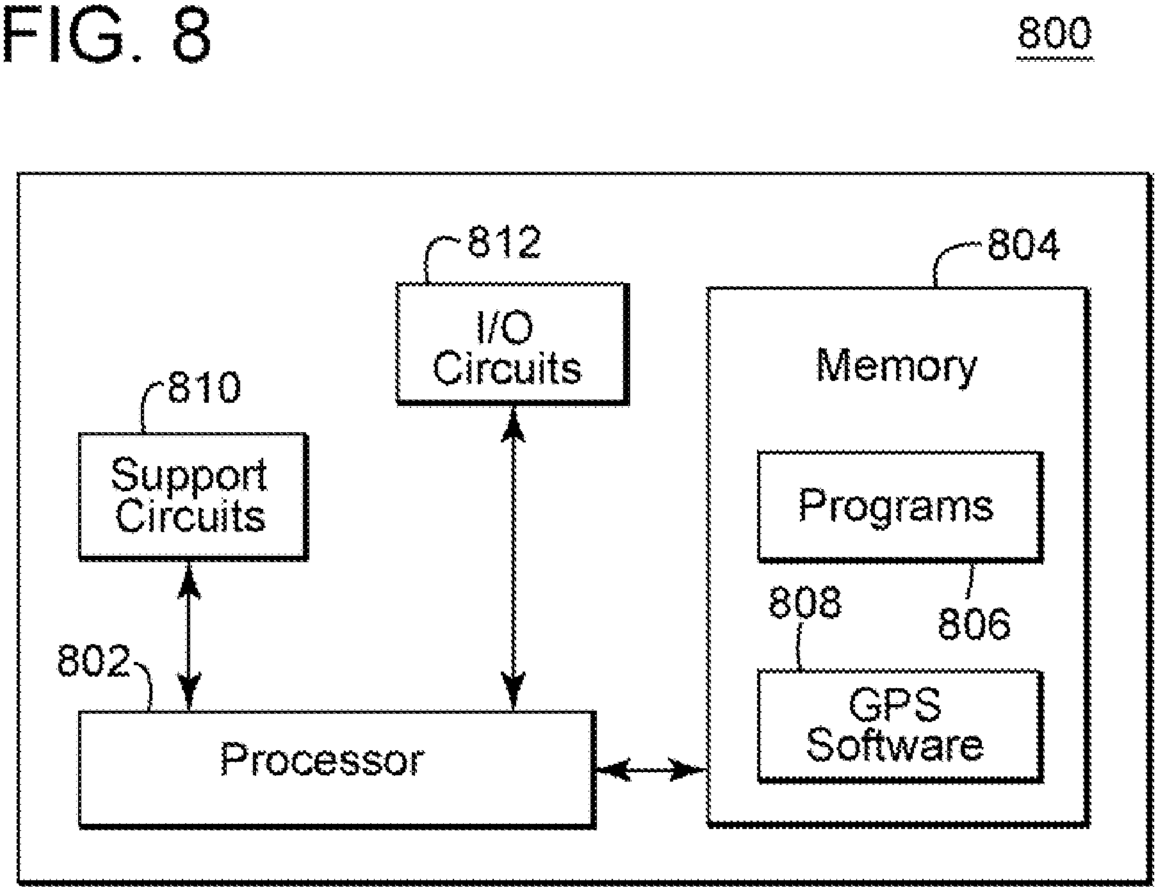
FIG. 8 depicts an exemplary high-level block diagram of computer architecture for performing aspects of this disclosure.

FIG. 8 depicts an exemplary high-level block diagram 800 of a computer architecture for performing aspects of this disclosure. The architecture 800 includes a processor 802 as well as a memory 804 for storing control programs 806 and the like. In addition, the memory 804 can also store GPS software (and the method 700 described above and depicted in FIG. 7). Although FIG. 8 is described as including the method 700 it is appreciated that controller 800 can include, in alternative embodiments (i.e., alternative instructions for accurately determining the location of the lockbox using a satellite based navigation system). The processor 802 cooperates with conventional support circuitry 810 such as power supplies, clock circuits, cache memory and the like as well as circuits that assist in executing the software routines stored in the memory 804. As such, it is contemplated that some of the process steps discussed herein as software processes may be implemented within hardware, for example, as circuitry that cooperates with the processor 802 to perform various steps. The controller 800 also contains input-output circuitry 812 that forms an interface between the various functional elements communicating with the controller 800. For example, in various embodiments, the controller 800 also communicates with a user interface (e.g., buttons on the lockbox) allowing a user to input desired characters and/or responses.

Although the controller 800 of FIG. 8 is depicted as a general-purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Figure 9:
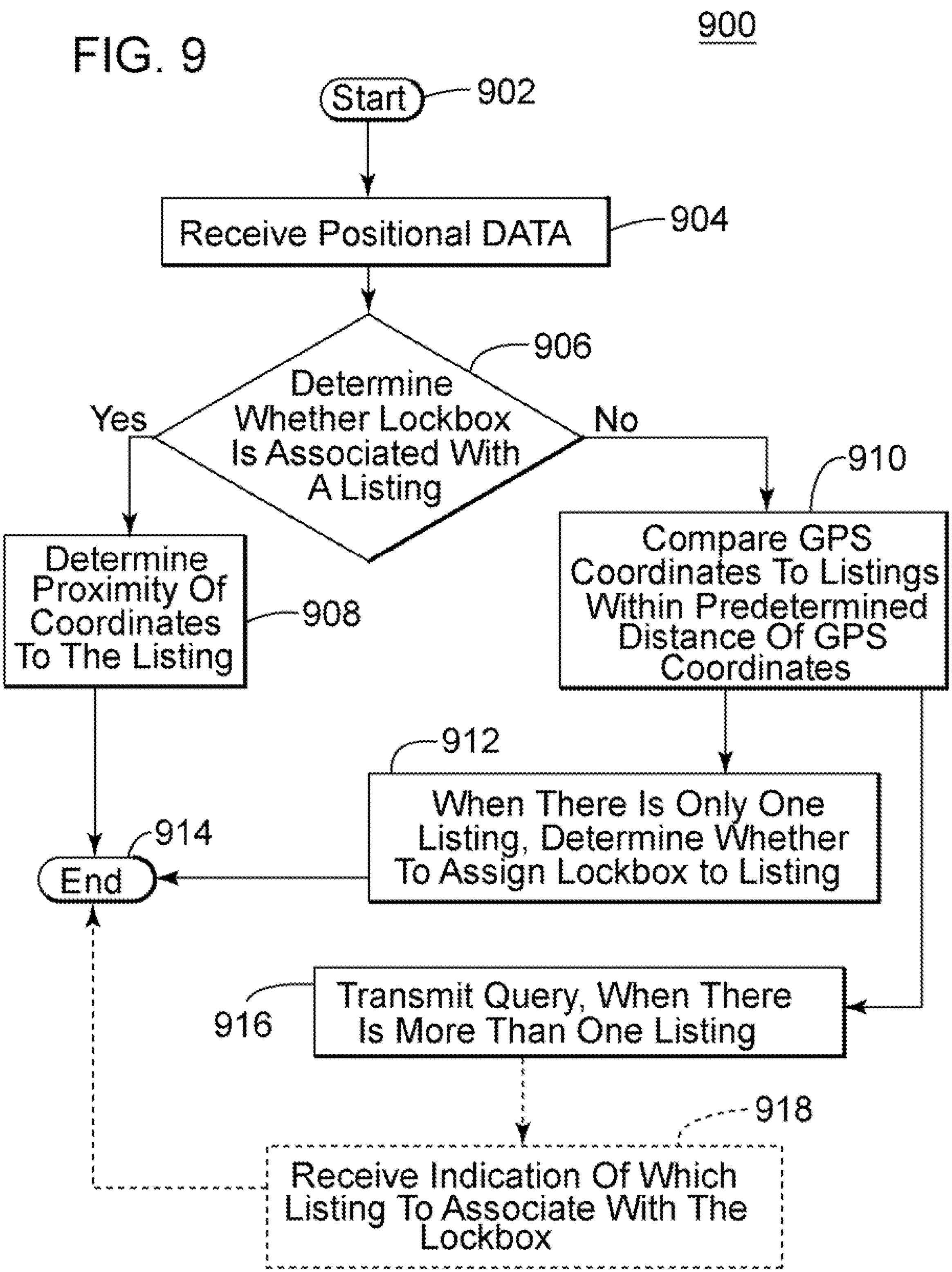
FIG. 9 depicts a flowchart of an embodiment of a method in accordance with aspects of this disclosure.

FIG. 9 depicts a flowchart of an embodiment of a method 900 in accordance with aspects of this disclosure. The method 900 begins at step 902 and proceeds to step 904.

At step 904, a server receives positional data (e.g. GPS coordinates) for the lockbox. Thereafter, the method 900 proceeds towards step 906.

At step 906, a determination is made whether the received positional data for the lockbox is associated with other data (e.g., a real estate listing) stored in the server. If at step 906, an affirmative determination is made, the method 900 proceeds towards step 908.

At step 908, a comparison of the proximity of the positional data to the stored coordinates for the listing is made. The results of the comparison are used to determine whether the stored coordinates of the lockbox should be updated to the newly received GPS coordinates. After step 908, the method 900 proceeds towards and ends at step 914.

If however, a negative determination is made at step 906, the method 900 proceeds to step 910. Step 910 compares all listings that are within a predetermined distance (e.g., about 100 meters) of the newly received GPS coordinates. Thereafter, the method 900 proceeds towards step 912.

At step 912, the method 900 checks whether there was only one listing acquired from the comparison performed in step 910. When there is only one listing acquired, a determination is made whether the lockbox is for that listing. For example, there may multiple lockboxes in a single building (e.g., at more than one unit in a building). After a determination that the lockbox is for that listing, the method proceeds towards and ends at step 914.

If however, there is more than one listing obtained at step 910, the method 900 proceeds towards step 916. At step 916, the server transmits a query towards a user (i.e., via the key and/or the lockbox) requesting that the user provide data indicative of the appropriate lockbox. For example, the query can, in various embodiments, include those listings from step 910 that are within the predetermined distance of the received positional data. After transmission of the query, the method 900 proceeds towards and ends at step 914. In various embodiments however, after step 916, the method 900 proceeds towards optional step 918.

At optional step 918, the server receives a response to the query in step 916. The received response is utilized update the server with the appropriate listing for the lockbox. Thereafter, the method 900 proceeds towards and ends at step 914.

Figure 10:
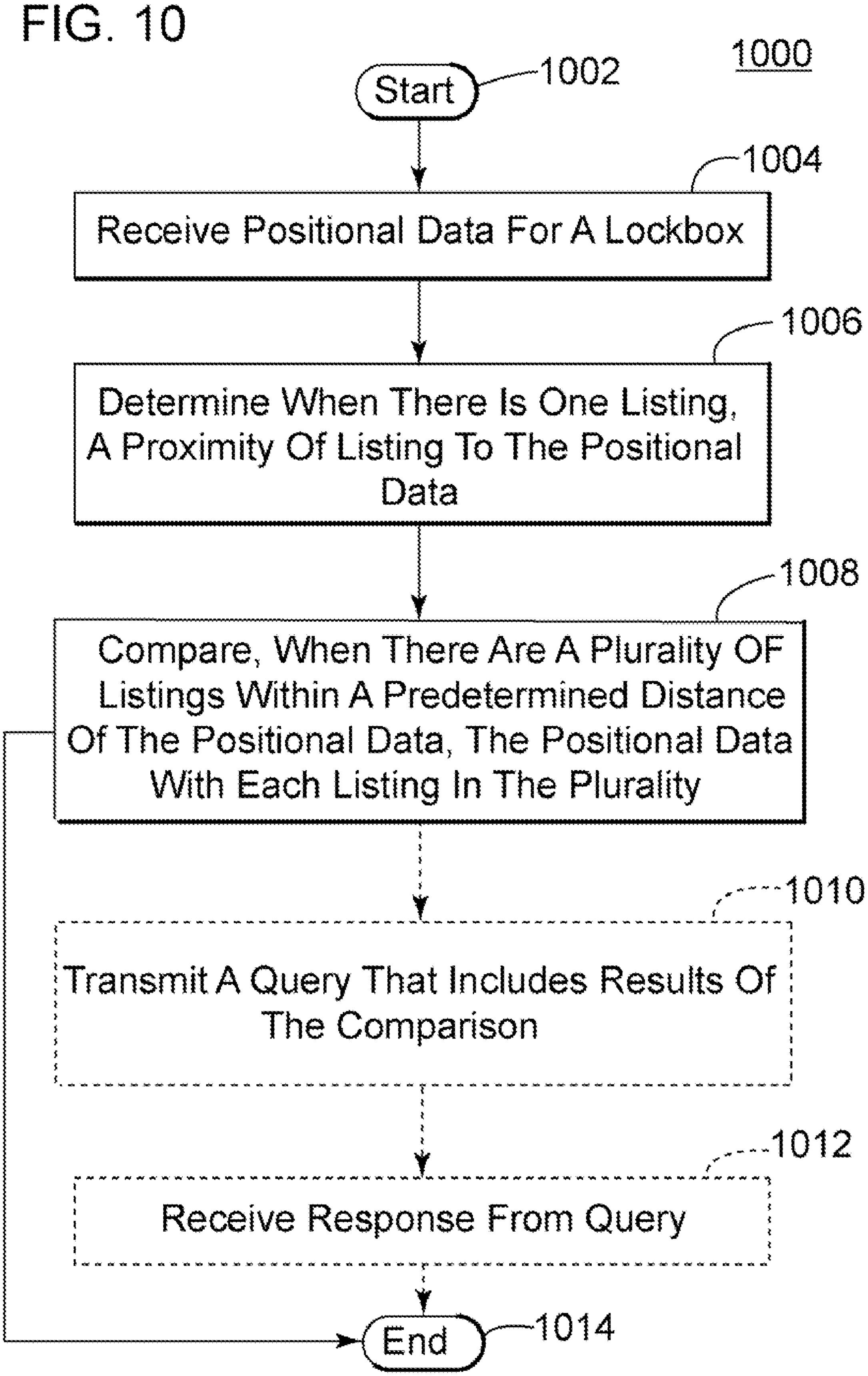
FIG. 10 depicts a flowchart of another embodiment of a method in accordance with aspects of this disclosure.

FIG. 10 depicts a flowchart of an embodiment of a method 1000 in accordance with aspects of this disclosure. The method 1000 begins at step 1002 and proceeds to step 1004.

At step 1004, a server receives the positional data (e.g. GPS coordinates) for the lockbox. Thereafter, the method 1000 proceeds towards step 1006.

At step 1006, a determination is made whether the received positional data for the lockbox is associated one listing and a proximity of the positional data to the stored position for the listing is made. The results of the comparison are used to determine whether the stored coordinates of the lockbox should be updated to the newly received GPS coordinates. After step 1006, the method 1000 proceeds towards step 1008.

Note however that steps 1006 and 1008 are mutually exclusive. For example, when conditions occur (i.e., there is one listing) which cause the function of step 1006 to be performed then although the method 1000 proceeds to step 1008, the conditions in step 1008 (i.e., there is more than one listing) cannot occur and the function of step 1008 will not be performed.

At step 1008, when there is more than one listing within a predetermined distance (e.g., about 100 meters) of the positional data, a comparison of all listings that are within a predetermined distance of the newly received positional data is performed. For example, there may multiple lockboxes in a single building (e.g., at more than one unit in a building). After step 1008, the method 1000 proceeds towards and ends at step 1014.

In alternate embodiments, the method 1000 includes optional step 1010 and in yet other embodiments includes optional steps 1010 and 1012. For example, after step 1008, the method 1000 proceeds towards optional step 1010. At optional step 1010, the server transmits a query towards a user (i.e., via the key and/or the lockbox) requesting that the user provide data indicative of the appropriate lockbox. For example, the query can, in various embodiments, include those listings from the comparison that are within the predetermined distance of the received GPS coordinates. After transmission of the query, the method 1000 proceeds towards and ends at step 1014 (or in various embodiments, proceed towards optional step 1012).

At optional step 1012, the server receives a response to the query at optional step 1010. The received response is utilized update the server with the appropriate listing for the lockbox. Thereafter, the method 1000 proceeds towards and ends at step 1014.

While the foregoing is directed to embodiments of the present invention, other and further embodiments of the invention may be devised without departing from the basic scope thereof, and the scope thereof is determined by the claims that follow.

The invention claimed is:

1. A method comprising:

receiving at a server positional data for a lockbox provided by satellite navigation system receiver circuitry associated with the lockbox;

determining whether the lockbox is associated with any real estate listing stored in the server;

determining, when said lockbox is associated with a real estate listing stored in the server, a proximity of the received positional data to said real estate listing;

determining whether to update stored positional data for the lockbox based upon the proximity of the received positional data to said real estate listing;

comparing, when the lockbox is not associated with any listing stored in the server and there are a plurality of listings within a predetermined distance of said received positional data, said received positional data with each listing in said plurality;

assigning the lockbox to one of the listings if only said one of the listings is within the predetermined distance of the received positional data; and transmitting a query comprising a result of said comparison if more than one listing is within the predetermined distance of the received positional data.

2. The method of claim 1, further comprising:

receiving a response to said query indicative of an appropriate listing for said lockbox.

3. The method of claim 2, further comprising:

updating a database to assign the lockbox to the appropriate listing, in accordance with said response.

4. The method of claim 1, further comprising:

initiating communication with the lockbox;

transmitting lockbox information including the positional data for the lockbox towards a key; and transmitting data including the positional data for the lockbox from said key towards the server.

* * * * *

UNITED STATES PATENT AND TRADEMARK OFFICE

CERTIFICATE OF CORRECTION

PATENT NO. : 8,040,218 B2
APPLICATION NO. : 12/130003
DATED : October 18, 2011
INVENTOR(S) : Jonathan Gordon Hays and Adam Purdue It is certified that error appears in the above-identified patent and that said Letters Patent is hereby corrected as shown below:

Col. 5, Line 42
Delete “are”
Insert --arc--

Col. 6, Line 51
Delete “shade”
Insert --shacle--

Signed and Sealed this
Thirteenth Day of December, 2011

David J. Kappos
*Director of the United States Patent and Trademark Office*